United States Patent
Zhang

(10) Patent No.: US 10,074,365 B2
(45) Date of Patent: Sep. 11, 2018

(54) VOICE CONTROL METHOD, MOBILE TERMINAL DEVICE, AND VOICE CONTROL SYSTEM

(71) Applicant: VIA Technologies, Inc., New Taipei (TW)

(72) Inventor: Guo-Feng Zhang, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 24 days.

(21) Appl. No.: 14/226,849

(22) Filed: Mar. 27, 2014

(65) Prior Publication Data

US 2014/0310004 A1     Oct. 16, 2014

(30) Foreign Application Priority Data

Apr. 10, 2013  (CN) .......................... 2013 1 0122599
Aug. 12, 2013  (CN) .......................... 2013 1 0349203

(51) Int. Cl.
G10L 15/22     (2006.01)

(52) U.S. Cl.
CPC ........ G10L 15/22 (2013.01); *G10L 2015/223* (2013.01)

(58) Field of Classification Search
CPC .......................... G10L 15/22; G10L 2015/223
USPC .......................................................... 704/275
See application file for complete search history.

(56) References Cited

U.S. PATENT DOCUMENTS

| 8,996,379 B2* | 3/2015 | Cerra | G10L 15/30 |
| | | | 704/270 |
| 2008/0221879 A1 | 9/2008 | Cerra et al. | |
| 2013/0157607 A1* | 6/2013 | Paek | H04W 4/90 |
| | | | 455/404.1 |
| 2014/0278419 A1* | 9/2014 | Bishop | G06F 3/16 |
| | | | 704/249 |

FOREIGN PATENT DOCUMENTS

CN          102520788          6/2012

* cited by examiner

*Primary Examiner* — Bharatkumar S Shah
(74) *Attorney, Agent, or Firm* — JCIPRNET

(57) ABSTRACT

A voice control method, a mobile terminal device, and a voice control system are provided. The voice control method includes the following steps. An application provides at least one operating parameter for a speech software development module. The speech software development module receives a voice signal and parses the voice signal, and thus a voice recognition result is obtained. The speech software development module determines whether the voice recognition result matches the operating parameters. When the voice recognition result matches the operating parameters, the speech software development module provides an operating signal for the application.

20 Claims, 4 Drawing Sheets

VOICE CONTROL METHOD, MOBILE TERMINAL DEVICE, AND VOICE CONTROL SYSTEM

CROSS-REFERENCE TO RELATED APPLICATION

This application claims the priority benefits of China application serial no. 201310122599.1, filed on Apr. 10, 2013, and China application serial no. 201310349203.7, filed on Aug. 12, 2013. The entirety of each of the above-mentioned patent applications is hereby incorporated by reference herein and made a part of specification.

BACKGROUND OF THE INVENTION

Field of the Invention

The invention relates to a voice control method, and more particularly, to a voice control method, a mobile terminal device, and a voice control system that use a voice control application.

Description of Related Art

With the advance of technology, the mobile terminal device having a voice system has become ubiquitous. The voice system allows communication between a user and the mobile terminal device through a speech understanding technique. For instance, the user only needs to say a certain request to the mobile terminal device, such as wanting to check the train number, the weather, or wanting to make a call, and the system takes the corresponding action according to the voice signal of the user.

Based on the practicability of the speech understanding technique, many developers have introduced the speech software development kit (SDK) to execute the speech understanding technique, such as achieving the recognition of Chinese characters from speech, performing speech synthesis, and achieving voice reading. Through the SDK, the developer or the user needs to add the performance function or the application to be used to the SDK, and then the SDK can execute the corresponding action according to the voice signal of the user.

Although the user can control the mobile terminal device through the SDK, for the performance function or the application not added to the SDK, the ability of voice interaction with the user is lost. In other words, if the application is not added to the SDK, then the user cannot control the application to execute the corresponding action through voice, thereby causing much inconvenience for the user.

Accordingly, how to improve the drawbacks is a topic for which a solution is urgently needed.

SUMMARY OF THE INVENTION

The invention provides a voice control method, a mobile terminal device, and a voice control system. The voice control method, the mobile terminal device, and the voice control system can allow the user to control the application in the mobile terminal device through voice so as to increase the convenience of using the mobile terminal device.

The invention provides a voice control method for a mobile terminal device. The voice control method has a first application. In the voice control method, the first application provides at least one operating parameter for a speech software development module. The mobile terminal device receives a voice signal and sends the voice signal to the speech software development module, wherein the speech software development module parses the voice signal to obtain a voice recognition result, and when the voice recognition result matches the operating parameters, the speech software development module provides an operating signal for the application according to the voice recognition result. The application receives the operating signal and executes the corresponding operation.

The invention further provides a voice control method for a speech software development module. In the voice control method, at least one operating parameter is received from an application. A voice signal is received and parsed to obtain a voice recognition result. Whether the voice recognition result matches the operating parameters is determined. When the voice recognition result matches the operating parameters, an operating signal is provided for the application according to the voice recognition result.

The invention further provides a voice control method. The voice control method is used for a mobile terminal device and a speech software development module, wherein the mobile terminal device has an application. In the voice control method, the application provides at least one operating parameter for a speech software development module. The speech software development module receives a voice signal through a voice receiving unit and parses the voice signal to obtain a voice recognition result. The speech software development module determines whether the voice recognition result matches the operating parameters. When the voice recognition result matches the operating parameters, the speech software development module provides an operating signal for the application according to the voice recognition result.

The invention further provides a voice control system. The voice control system includes a mobile terminal device and a server. The mobile terminal device includes a voice receiving unit and an application module. The voice receiving unit is used to receive a voice signal and the application is used to provide an application. The server is suitable for connecting to the mobile terminal device and the server has a speech software development module. In particular, the application provides at least one operating parameter for the speech software development module. The speech software development module receives a voice signal through a voice receiving unit and parses the voice signal to obtain a voice recognition result. The speech software development module determines whether the voice recognition result matches the operating parameters. When the voice recognition result matches the operating parameters, the speech software development module provides an operating signal for the application according to the voice recognition result.

The invention further provides a mobile terminal device. The mobile terminal device is connected to a speech software development module. The mobile terminal device includes a voice receiving unit and an application module. The voice receiving unit is used to receive a voice signal. The application module is used to provide an application. In particular, the application provides at least one operating parameter for the speech software development module. The speech software development module receives a voice signal from the voice receiving unit and parses the voice signal to obtain a voice recognition result. The speech software development module determines whether the voice recognition result matches the operating parameters. When the voice recognition result matches the operating parameters, the speech software development module provides an operating signal for the application according to the voice recognition result.

Based on the above, in the voice control method, the mobile terminal device, and the voice control system of the invention, an application provides operating parameters for a speech software development module and the speech software development module parses a voice signal from the user to obtain a voice recognition result. When the speech software development module determines the voice recognition result matches the operating parameters, the speech software development module provides an operating signal for the application. In this way, the invention can allow the user to control the application through voice to increase the convenience of using the mobile terminal device.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Although the current mobile terminal device can already provide a voice system to allow the user to communicate with the mobile terminal device by voice, if the application itself does not have speech understanding capabilities, then the user cannot control the application by voice to execute the corresponding operating function. Therefore, the invention provides a voice control method, a mobile terminal device, and a voice control system that allow the user to conveniently control the application in the mobile terminal device through voice so as to increase the convenience of using the mobile terminal device. In order to make the invention more comprehensible, embodiments are described below as examples to prove that the invention can actually be realized.

Figure 1:
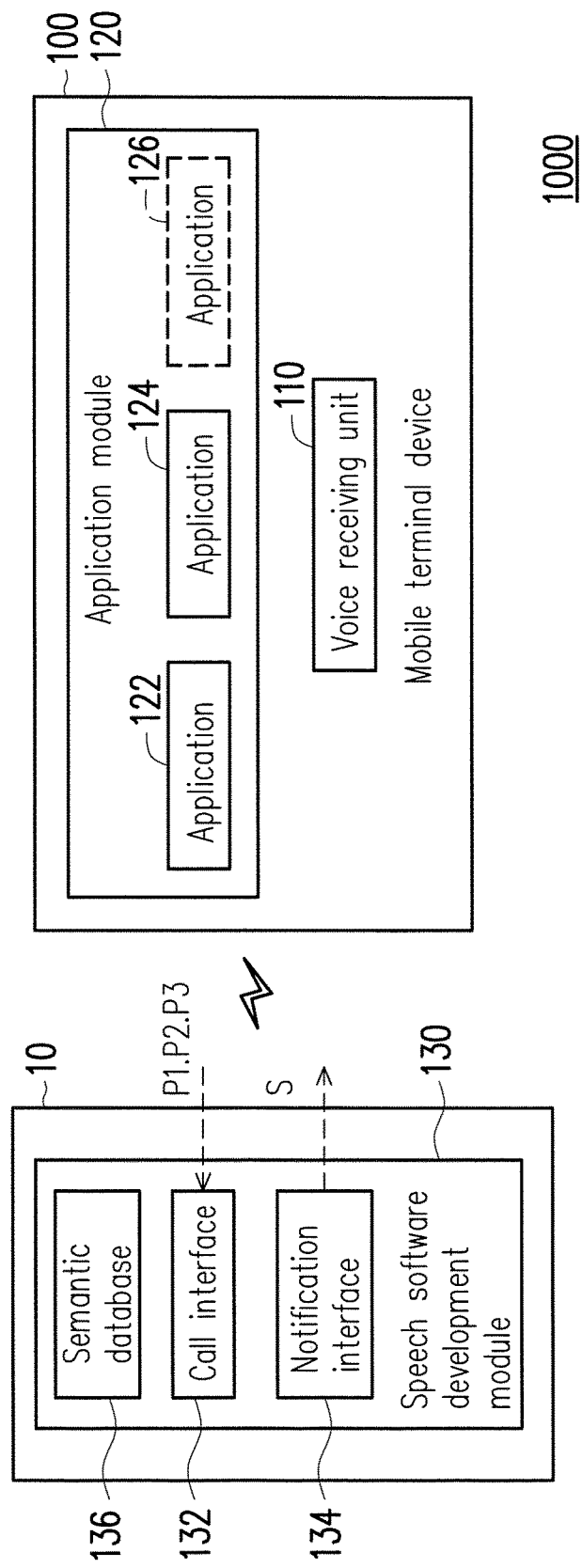
FIG. 1 is a block diagram of a voice control system illustrated according to an embodiment of the invention.

FIG. 1 is a block diagram of a voice control system 1000 illustrated according to an embodiment of the invention. Referring to FIG. 1, the voice control system 1000 has a mobile terminal device 100 and a server 10 and the mobile terminal device 100 can be connected to the server 10. The server 10 is, for instance, a cloud server and the server 10 includes a voice software development module 130. The mobile terminal device 100 is, for instance, a cell phone, a personal digital assistant (PDA) phone, a smart phone, or a pocket PC, a tablet PC, or a notebook computer installed with a communication software. The mobile terminal device 100 can be any portable mobile device having communication function, and the scope of the mobile terminal device 100 is not limited. Moreover, the mobile terminal device 100 includes a voice receiving unit 110 and an application module 120.

In the voice control system 1000, one or a plurality of operating parameters are sent to the voice software development module 130 of the server 10 from the mobile terminal device 100. When the mobile terminal device 100 receives a voice signal from the user through the voice receiving unit 110, the mobile terminal device 100 can send the voice signal to the voice software development module 130 in the server 10 and then the voice software development module 130 can parse the voice signal to obtain a voice recognition result. Here, the voice software development module 130 can determine whether the voice recognition result matches the operating parameters according to the voice recognition result. If yes, then the voice software development module 130 sends the corresponding operating signal to the application module 120 in the mobile terminal device 100 such that the application module 120 starts the application corresponding to the operating signal, or the application executes the corresponding operational function. The functions of the module are described in detail below.

The voice receiving unit 110 is used to receive a voice signal from the user and the voice receiving unit 110 is, for instance, a device receiving audio such as a microphone.

The application module 120 is used to provide one or a plurality of applications. The applications are, for instance, desktop applications, browser applications, word processing applications, or image capture applications, but are not limited thereto. FIG. 1 exemplarily illustrates applications 122, 124, and 126, but the present embodiment does not limit the number of the applications.

The speech software development module 130 is, for instance, a software development kit (SDK). The speech software development module 130 can provide functions such as speech recognition, speech synthesis, or other voice compilations.

It should be mentioned that, the application module 120 and the speech software development module 130 can be implemented by a hardware circuit formed by one or a plurality of logic gates. Alternatively, the application module 120 and the speech software development module 130 can be implemented by a computer code and executed by the central processor of the mobile terminal device 100.

The speech software development module 130 in the server 10 is used to generate the operating signal according to the voice signal. Specifically, the speech software development module 130 can provide a call interface 132, a notification interface 134, and a semantic database 136. In particular, the call interface 132 is used to receive a plurality of operating parameters from the applications 122, 124, and 126. The notification interface 134 is used to output the operating signal to the applications 122, 124, and 126 such that the applications 122, 124, and 126 execute the corresponding operating function according to the operating signal. The speech software development module 130 can parse the request information in the voice signal according to the semantic database 136. Specifically, the applications 122, 124, and 126 provide the operating parameters for the speech software development module 130 and the speech software development module 130 can parse the voice signal received by the voice receiving unit 110 according to the semantic database 136 to obtain a voice recognition result and determine whether the voice recognition result matches the operating parameters provided by the applications 122, 124, and 126. If the voice recognition result matches the operating parameters, then the speech software development module 130 outputs the operating signal corresponding to the voice recognition result to the applications 122, 124, and 126 through the notification interface 134. In particular, the operating signal has the command corresponding to the request information in the voice signal, and therefore the applications 122, 124, and 126 receive the operating signal and can execute the corresponding operating function. For instance, when the operating signal generated by the speech software development module 130 is "Previous", the application is controlled to execute the action of turning to the previous page. Alternatively, when the operating signal is "Goto, 3", the application is controlled to execute the action of turning to page "3". Alternatively, when the operating signal is "Brighter", the application is controlled to execute the action of increasing the brightness of the display by a little. Alternatively, when the operating signal is "Darker", the application is controlled to execute the action of dimming the brightness of the display by a little. Alternatively, when the operating signal is "Colorful", the application is controlled to execute the action of adjusting the brightness of the display to be a little more colorful. The operating signals are exemplary; the operating signal of the present embodiment is not limited thereto. It should be mentioned that the operating signal is, for instance, a document or a program file executable by the applications 122, 124, and 126, such as a file having the file format of "*exe", "*lib", or "*obj". Therefore, when the voice recognition result matches the operating parameters provided by at least one of the applications 122, 124, and 126, the speech software development module 130 can generate the corresponding operating signal according to the voice recognition result and send the operating signal to the corresponding application in the mobile terminal device 100 such that the application loads and executes the operating signal, thereby controlling the application.

It should be mentioned that, the developer or the user can also define the performance function of the speech software development module 130 themselves to control the mobile terminal device 100 by voice command or converse with the mobile terminal device 100. Here, the developer can define the speech software development module 130 according to the voice recognition result and send the defined operating signal to the application module 120 through the notification interface 134 such that the application module 120 starts the application corresponding to the defined operating signal. For instance, the developer can make the speech software development module 130 output a specific operating signal to the application 120 according to a voice recognition result having the same request information to start the application corresponding to the specific operating signal and make the application execute the operating function corresponding to the specific operating signal. For instance, when the user says voice signals such as "I'm done reading", "change page", "next", or "next page" to command a browser application to switch the web page, the speech software development module 130 can parse that the voice signals include the voice recognition result of the request information of "command the browser application to switch page", and then the speech software development module 130 generates a specific operating signal (such as "Next") (that is, the operating signal corresponding to "command the browser application to switch page"). Moreover, the speech software development module 130 sends the operating signal to the browser application in the application module 120 such that the browser application switches the page. As another example, when the user says voice signals such as "first page", "first", or "first song" to command a media player application to play the first media file, the speech software development module 130 can parse that the voice signals include the voice recognition result of the request information of "command the media player application to play the first media file", and then the speech software development module 130 generates a specific operating signal (such as "First") (that is, the operating signal corresponding to "command the media player application to play the first media file"). Moreover, the speech software development module 130 sends the operating signal to the media player application in the application module 120 such that the media player application plays the first media file.

In other words, when the user expresses the same request information with a variety of voice signals, the speech software development module 130 can send a single specific operating signal to the corresponding application, and the corresponding application can execute the corresponding operating function according to the specific operating signal. As a result, the application itself of the present embodiment does not need to provide a speech understanding function (such as voice recognition or speech synthesis), and when the user wishes to control the application through voice, the speech software development module 130 parses the voice of the user to determine whether to output the corresponding signal to the application. In this way, when the application receives the operating signal from the speech software development module 130, the application can execute the corresponding operating function. In other words, although the application itself can have or not have the function of receiving (or parsing) voice signals, after the application loads the operating signal generated by the speech software development module 130, the application is the same as an application having the function of receiving (or parsing) voice signals. As a result, the user can conveniently control the application through voice.

Figure 2:
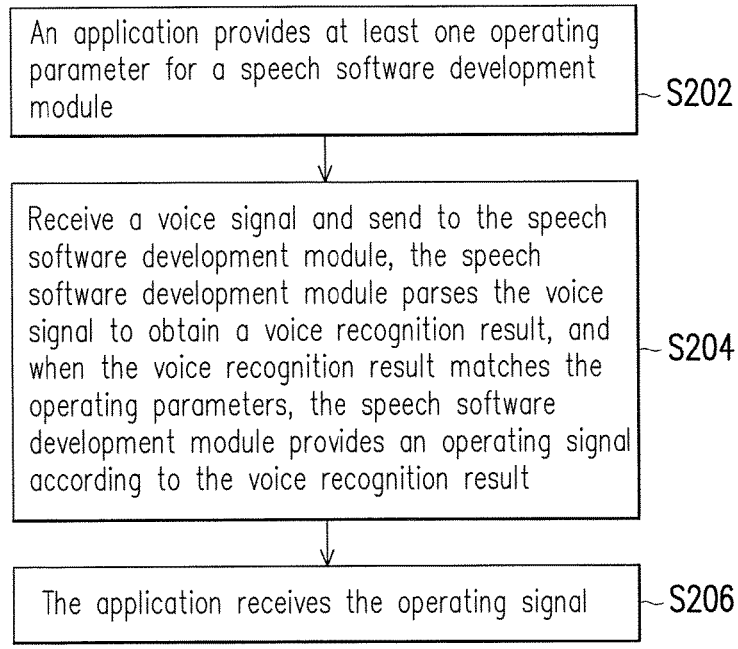
FIG. 2 is a flowchart of a voice control method illustrated according to an embodiment of the invention.

In the following, the voice control method is described with the voice control system 1000, wherein the application 122 is used as an example for the description. FIG. 2 is a flowchart of a voice control method illustrated according to an embodiment of the invention. Referring to both FIG. 1 and FIG. 2, in step S202, the application 122 provides at least one operating parameter P1 for the speech software development module 130. In the present embodiment, the application 122 can call the speech software development module 130 by providing the operating parameters P1, and when the speech software development module 130 receives the voice signal, speech understanding can commence. Moreover, the developer of the application can readily set the operating parameters of the application 122 that the user may use such that the application 122 provides for the speech software development module 130 according to the set operating parameters.

The operating parameters P1 are, for instance, used for the application 122 to represent the input value of a command, a text sequence, or the location information of an object receivable by the application 122 such as a command, a string parameter, or a location parameter, but are not limited thereto. Therefore, the speech software development module 130 can determine if the input value needed by the application 122 is a command, a text sequence, or location information according to the operating parameters P1 provided by the application 122. For instance, assume the application 122 is a browser application, and the operating parameters P1 provided by the application 122, for instance, correspond to the commands of "previous page", "next page", "enlarge page", or "reduce page", but are not limited thereto. Assume the application 122 is a notebook application, and the operating parameters P1 provided by the application 122, for instance, correspond to the commands of "add note" or "delete note", or correspond to a string parameter of reading a text sequence, but are not limited thereto. Moreover, assume the application 122 is a mail application, and the operating parameters P1 provided by the application 122, for instance, correspond to the command of "add mail", correspond to a string parameter of reading a text sequence, or a location parameter of a file when uploading the file, but are not limited thereto.

Then, in step S204, the mobile terminal device 100 receives a voice signal through the voice receiving unit 110 and sends the voice signal to the speech software development module 130. In particular, the speech software development module 130 parses the voice signal to obtain a voice recognition result, and when the voice recognition result matches the operating parameters P1, the speech software development module 130 provides an operating signal S according to the voice recognition result. The voice signal is, for instance, a voice from the user, and the voice signal has the request information of the user. Specifically, the voice signal from the user can be a command or a question such as "look at previous page", "enlarge fourth column of third line", "make the sound a little louder", "send the picture to my Twitter", "send the message to Tatung Wang", or "Will it rain today?".

Lastly, in step S206, the application 122 receives the operating signal S. Here, since the speech software development module 130 generates different operating signals S according to the matching operating parameters P1 in the voice recognition result to control the application 122, after the application 122 loads the operating signal S generated by the speech software development module 130, the application 122 is the same as an application 122 having the function of receiving (or parsing) voice signals. As a result, the user can conveniently control the application 122 through voice.

Figure 3:
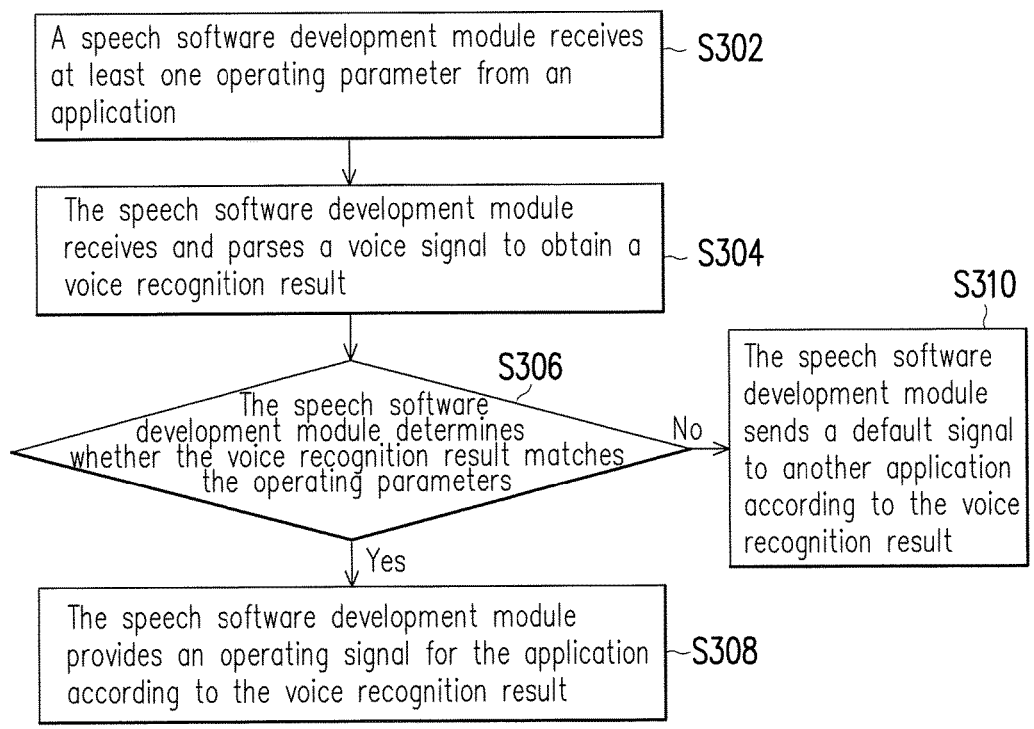
FIG. 3 is a flowchart of a voice control method illustrated according to an embodiment of the invention.

Another embodiment below describes the voice control method of the present embodiment in detail. In the following, the voice control method is still described with the voice control system 1000, wherein the application 122 is still used as an example for the description. FIG. 3 is a flowchart of a voice control method illustrated according to an embodiment of the invention. Referring to both FIG. 1 and FIG. 3, in step S302, the speech software development module 130 receives at least one operating parameter P1 from the application 122.

In step S304, the speech software development module 130 receives and parses a voice signal to obtain a voice recognition result.

In the present embodiment, the speech software development module 130 parses the voice signal from the user to obtain one or a plurality of feature semantics of the voice signal, and the speech software development module 130 generates a voice recognition result according to the feature semantics. Specifically, the feature semantics are, for instance, keywords obtained after the speech software development module 130 parses the voice signal, and the speech software development module 130 can obtain the request information of the user according to the feature semantics. For instance, when the voice signal is "look at previous page", the feature semantics obtained after the speech software development module 130 parses the voice signal are, for instance, "'look' and 'previous page'". As another example, when the voice signal is "make the sound a little louder", the feature semantics obtained after the speech software development module 130 parses the voice signal are, for instance, "'sound', 'a little' and 'louder'". Alternatively, when the voice signal is "send the picture to my Twitter", the feature semantics obtained after the speech software development module 130 parses the voice signal are, for instance, "'picture', 'send . . . to', and 'my Twitter'".

Specifically, the speech software development module 130 can search for the category corresponding to the feature semantics from the semantic database 136 according to the feature semantics, wherein the category is, for instance, a command, an object, time, a text sequence, or location information. More specifically, the semantic database 136 can record the relationship of the feature semantics and the corresponding category. Therefore, the speech software development module 130 can parse the request information in the voice signal according to the semantic database 136 and use the request information as the voice recognition result accordingly.

For instance, when the voice signal is "look at previous page", the speech software development module 130 first parses the feature semantics respectively as "'look' and 'previous page'", and then the speech software development module 130 can determine the "'look' and 'previous page'" are used to make the mobile terminal device 100 execute the command of "return the web page to the previous page" according to the semantic database 136. As another example, when the voice signal is "make the sound a little louder", the speech software development module 130 first parses the feature semantics respectively as "'sound', 'a little', and 'louder'", and then the speech software development module 130 can determine the voice signal is used to make the mobile terminal device 100 execute the command of "raise volume" according to the semantic database 136.

Then, in step S306, the speech software development module 130 determines whether the voice recognition result matches the operating parameters P1. Specifically, the semantic database 136 of the present embodiment can also store the relationship between the category corresponding to the feature semantics and the operating parameters. For instance, the semantic database 136 can record which operating parameter the category corresponding to the feature semantics corresponds to. Therefore, the speech software development module 130 can determine whether the voice recognition result matches the operating parameters P1 by searching the semantic database 136.

For instance, when the operating parameters P1 provided by the application 122 to the speech software development module 130 include "raise volume", "lower volume", "mute", "increase brightness", or "reduce brightness", and when the voice recognition result is used to make the mobile terminal device 100 execute the command of "raise volume", the speech software development module 130 determines whether the command of "raise volume" matches one of the operating parameters P1 of "raise volume", "lower volume", "mute", "increase brightness", or "reduce brightness".

When the speech software development module 130 determines the voice recognition result matches the operating parameters, then as shown in step S308, the speech software development module 130 provides the operating signal S for the application 122 according to the voice recognition result. Specifically, since the speech software development module 130 can provide different performance functions and the performance functions can receive different input values to generate the corresponding output, the speech software development module 130 generates different operating signals S according to the matching operating parameters P1 in different voice recognition results.

In the present embodiment, the performance function provided by the speech software development module 130 can be defined according to the developer or the user. That is, the developer or the user can define the speech software development module 130 according to different voice recognition results to generate the operating signal S corresponding to the voice recognition result. Therefore, when the voice recognition result matches the operating parameters P1, the speech software development module 130 can send the generated operating signal S to the application 122 providing the operating parameters P1 to control the application 122 through the operating signal S.

In the present embodiment, after the application receives the operating signal S, the corresponding operating function can be executed according to the operating signal S. Since the operating function corresponds to the operating parameters provided by the application, the speech software development module 130 controls the application 122 through the operating signal S such that the application 122 executes the operating function corresponding to the operating parameters P1. For instance, when the voice recognition result is used to make the mobile terminal device 100 execute the command of "raise volume" and the command matches the operating parameters P1, the mobile terminal device 100 generates the operating signal S corresponding to "raise volume" and sends the operating signal S to the application 122 such that the application 122 raises the volume. It should be mentioned that, after the application 122 receives the operating signal S, whether the operating function corresponding to the operating signal S is performed is determined according to the current state of the application 122. For instance, if the application determines the current volume of the mobile terminal device 100 is at the maximum value, then the application 122 does not raise the volume according to the operating signal S.

Back to step S306, when the speech software development module 130 determines the voice recognition result does not match the operating parameters P1, then as shown in step S310, the speech software development module 130 sends a default signal to the application module 124 according to the voice recognition result such that the application module 124 starts another application according to the default signal and receives the default signal. For instance, when the voice signal is "Will it rain tomorrow?" (the voice recognition result thereof is, for instance, used to make the mobile terminal device 100 execute the command of checking the weather), if the application 122 does not provide the operating parameters P1 corresponding to "check weather" to the speech software development module 130, then the speech software development module 130 determines the voice recognition result does not match the operating parameters P1. Here, the speech software development module 130 sends the default signal to the application module 124, and the application module 124 starts the search engine application (such as displaying the search engine application on the screen of the mobile terminal device 100) to check tomorrow's weather. As a result, if the application 122 started by the user does not provide the operating parameters P1 matching the voice recognition result, then the mobile terminal device 100 can automatically send the default signal to the application matching the voice recognition result.

An embodiment below describes the voice control method of the present embodiment in detail. Assume the user starts the application 122 and the application 122 is, for instance, a browser application. First, the application 122 provides the operating parameters P1 such as "look at previous page", "look at next page", "enlarge page", or "reduce page" of the command category for the speech software development module 130. Then, if the voice signal of the user is "look at previous page", then after the speech software development module 130 parses the voice signal, the voice signal can be determined to make the application 122 execute the command (that is, the voice recognition result) of returning to the previous web page. Since the voice recognition result matches the operating parameters P1 of "look at previous page", the speech software development module 130 sends the operating signal S to the application 122, wherein the operating signal S is used to control the application 122 to execute the action of returning to the previous web page. In this way, the user can control the application 122 to return to the previous web page through voice.

In another embodiment, when the speech software development module 130 provides the operating signal S to the application 122, the speech software development module 130 can also send the corresponding text sequence in the voice signal to the application 122 such that the application reads the corresponding text sequence in the voice signal and makes the application 122 execute the operating function corresponding to the operating signal S according to the text sequence. In the following, the application 122 is used as an example for the description with the voice control system 1000 of FIG. 1 and each of the steps of the voice control method of FIG. 3.

First, the speech software development module 130 receives at least one operating parameter P1 from the application 122 (step S302). Then, the speech software development module 130 receives and parses a voice signal to obtain a voice recognition result (step S304). When the speech software development module 130 determines whether the voice recognition result matches the operating parameters P1 (step S306), the speech software development module 130 can further determine whether the operating parameters P1 provided by the application 122 have a string parameter, that is, determine whether the input value needed by the application 122 is a text sequence.

Specifically, when the operating parameters P1 provided by the application 122 have a string parameter, the speech software development module 130 can view the parsed voice signal as a text sequence and provide the operating signal S for the application 122 according to the text sequence. Moreover, in an embodiment, the speech software development module 130 can further determine whether the voice recognition result has the text sequence corresponding to the string parameter therein. Here, if the speech software development module 130 determines the voice recognition result has the text sequence corresponding to the string parameter therein, then when the speech software development module 130 provides the operating signal S for the application 122 (step S308), the text sequence in the voice recognition result is sent to the provided application 122.

Moreover, if the speech software development module 130 determines the voice recognition result does not have the text sequence corresponding to the string parameter, then the speech software development module 130 does not send the text sequence to the application 122. Alternatively, when the speech software development module 130 determines the voice recognition result does not match the operating parameters P1, then the speech software development module 130 does not send the operating signal S to the application, or the speech software development module 130 sends the default signal to another application (step S310). In this way, the user not only can control the application through voice, but can also control the application 122 to read the corresponding text sequence in the voice.

For instance, assume the application 122 is a notebook application, then when the user starts the application 122

(such as clicking the application 122 or waking the application 122 through voice), the application 122 provides the operating parameters P1 such as "add note", "delete note", "modify note", and "mark note" of the command category and the operating parameters P1 of the string parameter category for the speech software development module 130. The operating parameters P1 are exemplary and are not limited thereto. Here, if the voice signal of the user received by the voice receiving unit 110 is "add note, content is 'meeting at one o'clock tomorrow afternoon'", then the speech software development module 130 parses the voice signal received by the voice receiving unit 110 to obtain the feature semantics of "'add', 'note', 'content is', 'tomorrow', 'afternoon', 'one o'clock', 'meeting'". Here, the speech software development module 130 determines the feature semantics of "'add', 'note', 'content is'" are the operating parameters P1 (that is, "add note") of the command category, and the speech software development module 130 can determine the voice signal appearing after "content is" (that is, "meeting at one o'clock tomorrow afternoon") is a text sequence corresponding to the string parameter, that is, the voice recognition result matches the operating parameters P1 of the string parameter category. Then, the speech software development module 130 sends the operating signal S according to the matching operating parameters P1 (that is, "add note") in the voice recognition result and sends the text sequence in the voice recognition result (that is, "meeting at o'clock tomorrow afternoon") to the application 122. Since the operating signal S corresponds to the operating parameter of "add note", the application 122 adds a note information and records the text sequence of "meeting at o'clock tomorrow afternoon" in the note. In this way, the user can command the application 122 to read the text sequence corresponding to the voice of the user directly through voice.

In another embodiment, when the speech software development module 130 provides the operating signal S for the application 122, the speech software development module 130 can also send the location information of the object referred to in the voice signal to the application 122 such that the application 122 can obtain the object path of the object. In the following, the application 122 is used as an example for the description with the voice control system 1000 of FIG. 1 and each of the steps of the voice control method of FIG. 3.

First, the speech software development module 130 receives at least one operating parameter P1 from the application 122 (step S302). Then, the speech software development module 130 receives and parses a voice signal to obtain a voice recognition result (step S304). When the speech software development module 130 determines whether the voice recognition result matches the operating parameters P1 (step S306), the speech software development module 130 can further determine whether the operating parameters P1 provided by the application 122 have a location parameter, that is, determine whether the input value needed by the application 122 is a path (such as a location or a web address). Moreover, the speech software development module 130 further determines whether the feature semantics parsed from the voice recognition result have the location information.

It should be mentioned that, if the speech software development module 130 parses the voice signal and recognizes the object, then the location information refers to the location of the object relative to the application 122. For instance, if the application 122 is an image browsing application, then the location information thereof can refer to the location of the image currently displayed by the application 122 (such as the middle region in the displayed image of the application 122). As another example, the location information can refer to the application 122 displaying the location of a partial region, and is not limited thereto.

In the present embodiment, when the speech software development module 130 parses the voice signal, the location information can be obtained by searching the semantic database 136. Specifically, the semantic database 136 of the present embodiment can record the relationship of a location keyword and the location information therein, wherein the location keyword is, for instance, the keyword said by the user when alleging the object. For instance, if the user opens a plurality of images when operating the image browsing application, then the location keyword is, for instance, "this", "all", or "upper left corner". Here, the semantic database 136 can record which location keywords correspond to which location the application 122 referred to. For instance, when the location keyword is "this", the semantic database 136 records that "this" corresponds to the image currently displayed on the display screen of the application 122, and the image is, for instance, located in the middle region in the display screen of the application 122. As another example, when the location keyword is "upper left corner", the semantic database 136 records that "upper left corner" corresponds to the image displayed in the upper left corner of the display screen of the application 122. As a result, the speech software development module 130 can determine the location of the object referred to in the voice signal relative to the application 122 (that is, the location information of the object) according to the location keyword of the object in the voice signal.

In the present embodiment, when the voice recognition result has the location information, the speech software development module 130 obtains the object path of the object according to the location information. The object path refers to the location source of the object (such as the location or the web address of the object). For instance, for the object stored in the mobile terminal device 100, the object path thereof is, for instance, the file path of the object. For the object in the internet, the object path thereof is, for instance, the web address for opening the object. In other words, the speech software development module 130 can obtain the object path of the object in the application 122 according to the location information.

In this way, when the operating parameters P1 provided by the application 122 have the location parameter and the speech software development module 130 determines the voice recognition result matches the operating parameters P1 provided by the application 122 (that is, the voice recognition result has the location information corresponding to the location parameter therein), the speech software development module 130 provides the operating signal S for the application 122 such that the application 122 obtains the object path corresponding to the location information and obtains the object according to the object path. It should be mentioned that, since the speech software development module 130 can obtain different feature semantics after parsing the voice signal, the speech software development module 130 can determine the target information referred to in the voice signal according to the feature semantics, wherein the target information has the information of the target end therein. Accordingly, the speech software development module 130 can provide the operating signal S for the application 122 such that the application 122 obtains the object according to the object path and sends the object to the target end according to the target information. Another example is described below.

Assume the application 122 is an image browsing application, and when the user starts the application 122 to browse images, the application 122 sends the operating parameters P1 of, for instance, "add image", "delete image", "send image", or "edit image" to the speech software development module 130. If the voice signal said by the user is "send the current picture to my Twitter", then the speech software development module 130 can parse the feature semantics of "'current", 'picture', 'send . . . to', 'my Twitter'" from the voice signal. Here, since the semantic database 136 can record the relationship between the keywords corresponding to the feature semantics and the command, the location information, or the target information, the speech software development module 130 parses which feature semantics correspond to the command, which feature semantics correspond to the location information of the object, or which feature semantics correspond to the voice recognition results of the target information according to the keywords corresponding to the feature semantics. Therefore, for the voice signal, the speech software development module 130 can parse that "current" is the location information, "picture" is the object, "send . . . to" is the command, and "my Twitter" is the target information. That is, the voice recognition result obtained after the speech software development module 130 parses that the voice signal matches the operating parameters P1 (that is, "send image") provided by the application 122, and that the feature semantics parsed from the voice recognition result correspond to the object, the location information, and the target information.

Then, the speech software development module 130 can send the operating signal S to the application 122 (step S308), wherein the operating signal S has the command, the location information of the object, and the target information. Therefore, the application 122 obtains the object path (such as the picture is stored in the file path of the mobile terminal device 100 or the application 122 opens the web address of the picture) of the object according to the location information (that is, "current") and sends the object to the target end (that is, "my Twitter"). In this way, the user can command the application 122 to obtain the object path of the object directly through voice to execute the operating function of the application 122.

It should be mentioned that, when the speech software development module 130 determines the voice recognition result does not match the operating parameters, the speech software development module 130 can provide the operating signal S for another application matching the voice recognition result according to the voice recognition result so as to control the other application to execute the operating function corresponding to the operating signal S. Another embodiment is described below.

Figure 4:
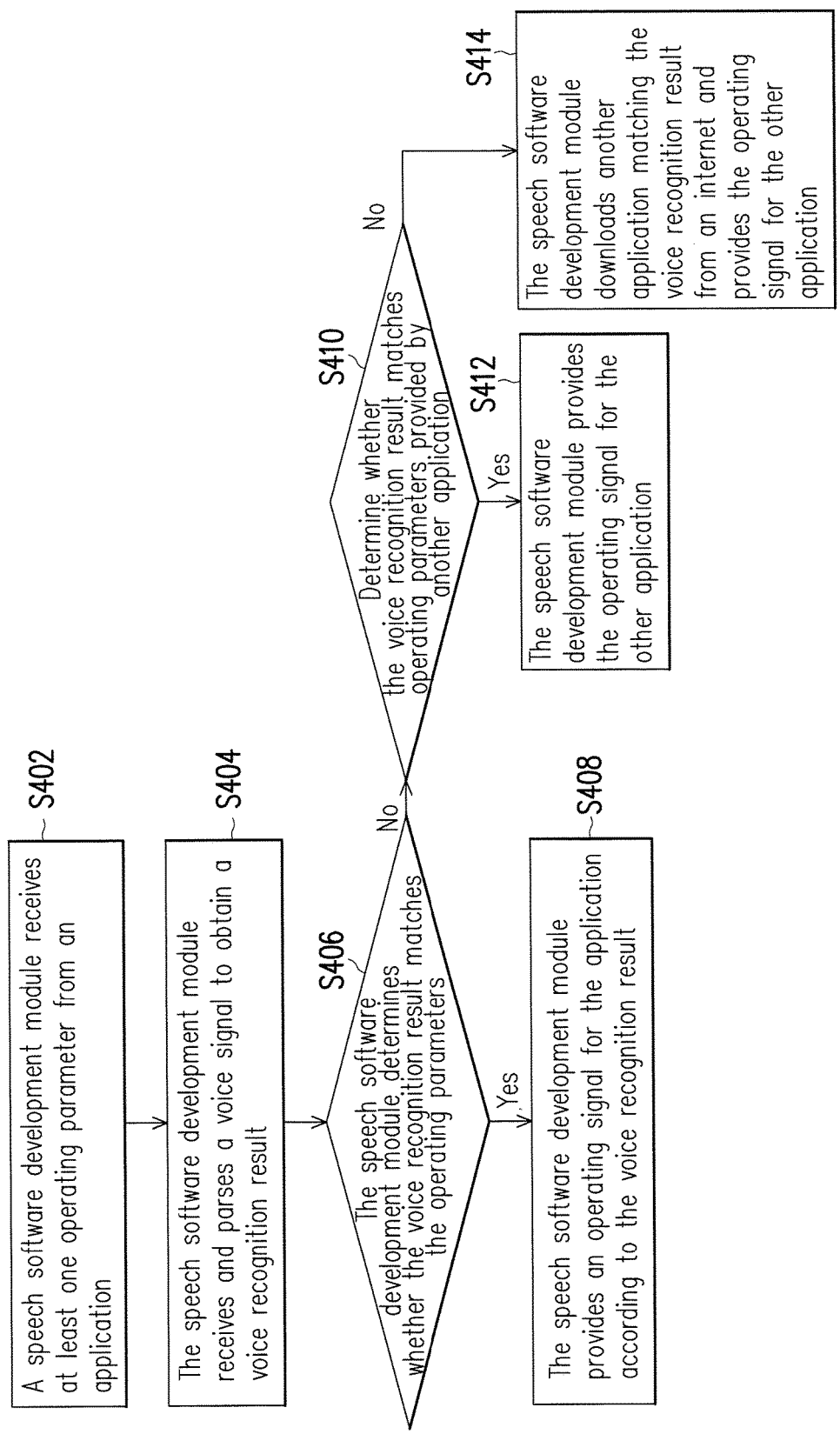
FIG. 4 is a block diagram of a voice control method illustrated according to an embodiment of the invention.

FIG. 4 is a flowchart of a voice control method illustrated according to an embodiment of the invention. Referring to FIG. 1, FIG. 3, and FIG. 4 at the same time, the voice control method of the present embodiment is similar to the steps of FIG. 3 (steps S402-S408 of FIG. 4 correspond to steps S302-S308 of FIG. 3), with the difference being: in step S406 of FIG. 4, when the speech software development module 130 determines the voice recognition result does not match the operating parameters P1, then as shown in step S410, the speech software development module 130 determines whether the voice recognition result matches the operating parameters P2 provided by the other applications (such as the application 124), wherein the application 124 is, for instance, already started by the user and is executed in background mode.

When the speech software development module 130 determines the voice recognition result matches the operating parameters P2 provided by the application 124, then as shown in step S412, the speech software development module 130 provides the operating signal S for the application 124 such that the application 124 executes the corresponding operating function.

On the other hand, when the speech software development module 130 determines the voice recognition result does not match the operating parameters provided by the applications 122, 124 and the other applications, then as shown in step S414, the speech software development module 130 downloads an application matching the voice recognition result from the internet (such as the application 126), wherein the application 126 can provide the operating parameters P3 matching the voice recognition result. Moreover, the speech software development module 130 can provide the operating signal S for the application 126 such that the application 126 executes the corresponding operating function. Another example is described below.

Here, assume the voice signal said by the user is "send the current picture to my Twitter", wherein the voice recognition result obtained after the speech software development module 130 parses that the voice signal has the command of "send . . . to". Moreover, assume the operating parameters P1 provided by the application 122 for the speech software development module 130 does not have the operating parameter corresponding to "send . . . to". In the present embodiment, the speech software development module 130 determines whether the operating parameters provided by the other applications have the operating parameter corresponding to the command of "send . . . to". If the application 124 is activated by the user and the operating parameter P2 matching the command of "send . . . to" is provided for the speech software development module 130, then the speech software development module 130 provides the operating signal S for the application 124. Moreover, if the applications 122, 124 or the other applications do not provide the operating parameter corresponding to the command of "send . . . to" for the speech software development module 130, then the speech software development module 130 downloads the application 126 that can provide the operating parameter matching "send . . . to" from the internet according to the command of "send . . . to". Accordingly, the speech software development module 130 can provide the operating signal S to the application 126. In this way, the speech software development module 130 can automatically determine the application corresponding the operating parameters matching the voice recognition result according to the voice recognition result obtained after the speech software development module 130 parses the voice signal, and send the operating signal to the application such that the user can more conveniently control the application through voice.

It should be mentioned that the speech software development module 130 in the embodiments can also disposed on the mobile terminal device to achieve the voice control method of the invention. Another embodiment is described below.

Figure 5:
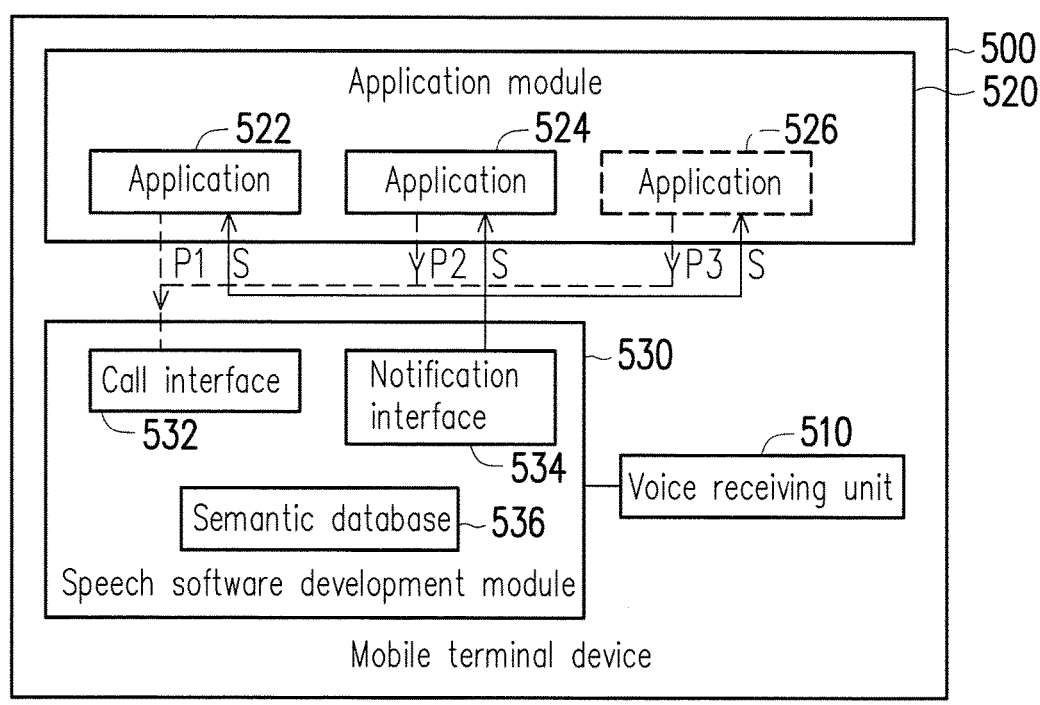
FIG. 5 is a flowchart of a mobile terminal device according to an embodiment of the invention.

FIG. 5 is a block diagram of a mobile terminal device 500 according to an embodiment of the invention. Referring to FIG. 5 and FIG. 1, the mobile terminal device 500 is similar to the mobile terminal device 100 of FIG. 1, with the difference being a speech software development module 530 is disposed in the mobile terminal device 500. The mobile terminal device 500 of the present embodiment can also execute steps S202-S206 of FIG. 2, steps S302-S310 of FIG. 3, and steps S402-S414 of FIG. 4, and therefore the details thereof are not repeated herein.

It should be mentioned that, the speech software development module in the embodiments can also operate with other electronic devices having an application, or be disposed in an electronic device, wherein the electronic device is, for instance, an electrical equipment such as a washing machine, a dish washer, an air conditioner, a vacuum cleaner, a television, or a refrigerator, but is not limited thereto. In other words, the user can control the electronic device directly through voice to execute the corresponding operating function. Specifically, the electronic device provides a voice receiving device such as a microphone; a network connection device and a storage device storing an application are enough. The application therein can provide the operating parameters for the speech software development module (for instance, the speech software development module can be connected to the electronic device through WiFi (wireless fidelity) communication protocol from the server side, or be directly disposed in the storage device of the electronic device). When the user provides a voice signal, the speech software development module can receive and parse the voice signal to obtain a voice recognition result. If the speech software development module determines the voice recognition result matches the operating parameters provided by the application, then an operating signal can be generated and sent to the corresponding application such that the application executes the corresponding operating function. For instance, for the air conditioner, the application in the air conditioner can provide the operating parameter corresponding to "increase temperature" for the speech software development module, and when the user says the voice signal of "increase the temperature a little", the speech software development module can determine that the voice signal corresponds to the operating parameter of "increase temperature", and thereby generate the corresponding operating signal to the application in the air conditioner. After the application in the air conditioner loads the operating parameter, the set temperature of the air conditioner can be increased. In this way, for the general electronic equipment having a simple function or a special function, the electronic equipment only needs to receive the operating signal generated by the speech software development module and thereby operate according to the voice of the user. Accordingly, the user can conveniently control the electrical equipment through voice.

Based on the above, in the voice control method, the mobile terminal device, and the voice control system of the invention, an application provides operating parameters for a speech software development module and the speech software development module parses a voice signal from the user to obtain a voice recognition result. Here, the speech software development module determines whether the voice recognition result matches the operating parameters, and therefore when the voice recognition result matches, the speech software development module provides an operating signal for the application. In particular, the speech software development module can send request information such as a command, a text sequence, and the location information of an object in the voice recognition result to the application according to the voice recognition result such that the application executes the operating function corresponding to the operating signal. Since the speech software development module performs voice recognition and thereby controls the application by providing a signal, the application can also execute the operating function corresponding to the voice signal of the user in the situation that the application does not perform speech understanding (such as voice recognition or speech synthesis). In this way, through the speech software development module, the invention can allow the user to control an application through voice and to execute an action and work provided by a variety of applications, and thereby increase the convenience of using the mobile terminal device.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A voice control method for a mobile terminal device connecting to a speech software development module in a server, wherein the mobile terminal device has a first application, the method comprising:

providing, by the first application which does not have voice control function, a plurality of first operating parameters which comprise a plurality of first commands, a first string parameter, and a first location parameter to the speech software development module, wherein the plurality of first commands represent a plurality of input values of a plurality of commands for operating the first application, the first string parameter represents an input value of a text sequence, and the first location parameter represents an input value of a location information of an object receivable by the first application;

receiving, by the mobile terminal device, a voice signal subsequently sent to the speech software development module, wherein the speech software development module parses the voice signal to obtain a voice recognition result and determines whether the voice recognition result matches one or more of the plurality of first operating parameters;

obtaining, by the speech software development module, an object path which indicates a location of a source storing the object from a location information in the voice recognition result in response to (1) the location information in the voice recognition result being determined that matching the first location parameter of the plurality of first operating parameters and (2) a command in the voice recognition result being determined that matching one of the plurality of first commands which instructs the first application to obtain the object;

generating, by the speech software development module, according to the object path and one of the plurality of first commands, a first operating signal which instructs the first application to obtain the object from the object path, wherein the first operating signal is sent to the first application of the mobile terminal device; and when the first operating signal is received by the first application, executing, by the first application, a first operating function for obtaining the object through the object path from the source according to the first operating signal, such that the first application without voice control function is capable of being controlled by the voice signal received by the mobile terminal device.

2. The method of claim 1, the method further comprising:
receiving by the first application, the text sequence, which is obtained by the
speech software development module according to the voice recognition result in response to the text sequence determined to correspond to the first string parameter.

3. The method of claim 1, wherein the voice recognition result further has a target information, the method further comprising:
receiving by the first application* a second operating signal, which comprises a target end, generated by the speech software development module according to the target information in response to the target information determined to correspond to the plurality of first commands for sending the object; and
executing by the first application, a second operating function to send the object to the target end according to the second operating signal.

4. The method of claim 1, wherein the mobile terminal device further has a second application, the method further comprises:
receiving by the second application a third operating signal, which is generated by the speech software development module according to the voice recognition result in response to the voice recognition result determined not matching the plurality of first operating parameters but matching a second operating parameter provided by the second application; and
executing by the second application a third operating function according to the third operating signal.

5. The method of claim 1, the method further comprises:
downloading by the mobile terminal device* a third application which provides a
third parameter matching the voice recognition result in response to the voice recognition result determined not matching the plurality of first operating parameters.

6. A voice control method for a speech software development module in a server connecting to a mobile terminal device, the method comprising:
receiving from a first application, which does not have voice control function, of the mobile terminal device* a plurality of first operating parameters which comprise a plurality of first commands, a first string parameter, and a first location parameter, wherein the plurality of first commands represent a plurality of input values of a plurality of commands for operating the first application, the first string parameter represents an input value of a text sequence, and the first location parameter represents an input value of a location information of an object receivable by the first application;
receiving a voice signal from the mobile terminal device, parsing the voice signal to obtain a voice recognition result, and determining whether the voice recognition result matches one or more of the plurality of first operating parameters, wherein the voice signal is first received by the mobile terminal device and subsequently sent to the speech software development module;
obtaining an object path which indicates a location of a source storing the object from the location information in the voice recognition result in response to (1) the location information of the voice recognition result being determined that matching the first location parameter of the plurality of first operating parameters and (2) a command in the voice recognition result being determined that matching one of the plurality of first commands which instructs the first application to obtain the object; and generating, according to the object path and one of the plurality of first commands, a first operating signal which instructs the first application to obtain the object from the object path, wherein the first operating signal is sent to the first application of the mobile terminal device,
wherein when the first operating signal is received by the first application of the mobile terminal device, the first application executes a first operating function for obtaining the object through the object path from the source according to the first operating signal, such that the speech software development module enables the first application without voice control function to be controlled by the voice signal received by the mobile terminal device.

7. The method of claim 6, further comprising:
sending the text sequence, which is obtained according to the voice
recognition result, to the first application in response to the text sequence determined to correspond to the first string parameter.

8. The method of claim 6, wherein the voice recognition result further has a target information, the method further comprising:
obtaining a target end according to the target information; and
sending to the first application a second operating signal, which comprises the target end, generated according to the voice recognition result in response to the target information determined to correspond to the plurality of first commands for sending the object such that the first application executes a second operating function to send the object to the target end according to the second operating signal.

9. The method of claim 6, wherein the mobile terminal device further has a second application, further comprising:
generating a third operating signal according to the voice recognition result in response to the voice recognition result determined not matching the plurality of first operating parameters but matching a second operating parameter provided by the second application; and
sending the third operating signal to the second application such that the second application executes a third operating function according to the third operating signal.

10. The method of claim 6, further comprising:
generating a fourth operating signal according to the voice recognition result; and
sending the fourth operating signal to a third application, which provides a third operating parameter matching to the voice recognition result, downloaded from an internet by the mobile terminal device in response to the voice recognition result determined not matching the plurality of first operating parameters.

11. A voice control system, comprising: a mobile terminal device, comprising:
a microphone for receiving a voice signal; and
an application circuit for providing a first application without voice control function; and
a server suitable for connecting to the mobile terminal device, the server having a speech software development module,
wherein the first application provides a plurality of first operating parameters which comprise a plurality of first commands, a first string parameter, and a first location parameter to the speech software development module,
wherein the plurality of first commands represent a plurality of input values of a plurality of commands for operating the first application, the first string parameter represents an input value of a text sequence, and the first location parameter represents an input value of a location information of an object receivable by the first application, wherein the speech software development module receives the voice signal through the microphone and parses the voice signal to obtain a voice recognition result, wherein the speech software development module determines whether the voice recognition result matches one or more of the plurality of first operating parameters, wherein, in response to (1) the location information in the voice recognition result being determined that matching the first location parameter of the plurality of first operating parameters and (2) a command in the voice recognition result being determined that matching one of the plurality of first commands which instructs the first application to obtain the object, the speech software development module obtains an object path which indicates a location of a source storing the object from the location information in the voice recognition result, wherein the speech software development module generates, according to the object path and one of the plurality of first commands, a first operating signal which instructs the first application to obtain the object from the object path, wherein the first operating signal is sent to the first application, wherein when the first operating signal is received by the first application, the first application executes a first operating function for obtaining the object through the object path from the source according to the first operating signal, such that the first application without voice control function is capable of being controlled by the voice signal received by the mobile terminal device.

12. The voice control system of claim 11,
wherein the speech software development module obtains the text sequence according to the voice recognition result, and sending the text sequence to the first application in response to the text sequence determined to correspond to the first string parameter.

13. The voice control system of claim 11,
wherein voice recognition result further has a target information and the speech software development module obtains a target end according to the target information,
wherein the speech software development module generates and sends a second operating signal, which comprises the target end, to the first application according to the voice recognition result in response to the target information determined to correspond to the plurality of first commands for sending the object,
wherein the first application executes a second operating function to send the object to the target end according to the second operating signal.

14. The voice control system of claim 11, wherein the mobile terminal device further has a second application,
wherein the speech software development module generates a third operating signal according to the voice recognition result in response to the voice recognition result determined not matching the plurality of first operating parameters but matching a second operating parameter provided by the second application, and sends the third operating signal to the second application such that the second application executes a third operating function according to the third operating signal.

15. The voice control system of claim 11,
wherein the mobile terminal device downloads a third application which provides a third operating parameter matching to the voice recognition result in response to the voice recognition result determined not matching the plurality of first operating parameters,
the speech software development module generates a fourth operating signal according to the voice recognition result, and sends the fourth operating signal to a third application.

16. A mobile terminal device connected to a speech software development module in a server, the mobile terminal device comprising: a microphone for receiving a voice signal; and an application circuit for providing a first application,
wherein the first application provides a plurality of fir operating parameters which comprise a plurality of first commands, a first string parameter, and a first location parameter to the speech software development module, wherein the plurality of first commands represent a plurality off input values of a plurality of commands for operating the first application, the first string parameter represents and input value of a text sequence, and the first location parameter represents an input value of a location information of an object receivable by the first application,
wherein the mobile terminal device receives the voice signal via the microphone, and sends the voice signal to the speech software development module,
wherein when the speech software development module receives the voice signal from the mobile terminal device, the speech parses the voice signal to obtain a voice recognition result, and determines whether the voice recognition result matches one or more of the plurality of first operating parameters,
wherein, in response to (1) a location information in the voice recognition result being determined that matching the first location parameter of the plurality of first operating parameters and (2) a command in the voice recognition result being determined that matching one of the plurality of first commands which instructs the first application to obtain the object, the speech software development module obtains an
object path which indicates a location of a source storing the object from the location information in the voice recognition result,
wherein the speech software development module generates, according to the object path and one of the plurality of first commands, a first operating signal which instructs the first application to obtain the object from the object path, and wherein the first operating signal is sent to the first application of the mobile terminal device,
when the first application of the mobile terminal device receives the first operating signal, the first application executes a first operating function for obtaining the object through the object path from the source according to the first operating signal, such that the first application without voice control function is capable of being controlled by the voice signal received by the mobile terminal device.

17. The mobile terminal device of claim 16,
wherein the speech software development module obtains the text sequence according to the voice recognition result, and sending the text sequence to the first application in response to the text sequence determined to correspond to the first string parameter.

18. The mobile terminal device of claim 16,
wherein the voice recognition result further has a target information and the speech software development module obtains a target end according to the target information,
wherein the speech software development module generates and sends a second operating signal, which comprises the target end, to the first application according to the voice recognition result in response to the target information determined to correspond to the plurality of first commands for sending the object,
wherein the first application executes a second operating function to send the object to the target end according to the second operating signal.

19. The mobile terminal device of claim 16, wherein the mobile terminal device further has a second application,
wherein the second application provides a second operating parameter to the speech software development module,
wherein the speech software development module generates a third operating signal according to the voice recognition result in response to the voice recognition result determined not matching the plurality of first operating parameters but matching the second operating parameter, and sends the third operating signal to the second application such that the second application executes a third operating function according to the third operating signal.

20. The mobile terminal device of claim 16,
wherein the mobile terminal device downloads a third application which provides a third operating parameter matching to the voice recognition result in response to the voice recognition result determined not matching the plurality of first operating parameters,
the speech software development module generates a fourth operating signal according to the voice recognition result, and sends the fourth operating signal to a third application.

* * * * *